Aug. 7, 1951 A. OAS 2,563,059
TILE CUTTING MACHINE
Filed Aug. 30, 1948 2 Sheets-Sheet 1
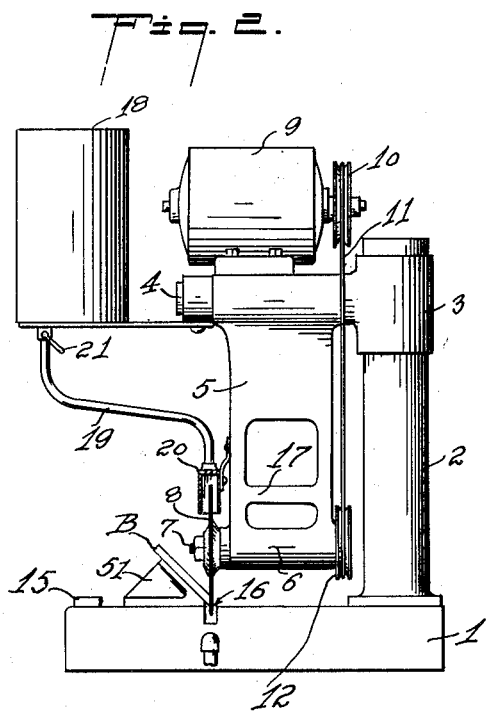
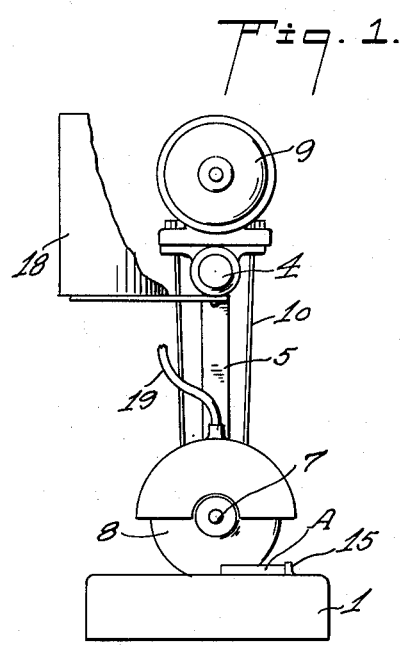
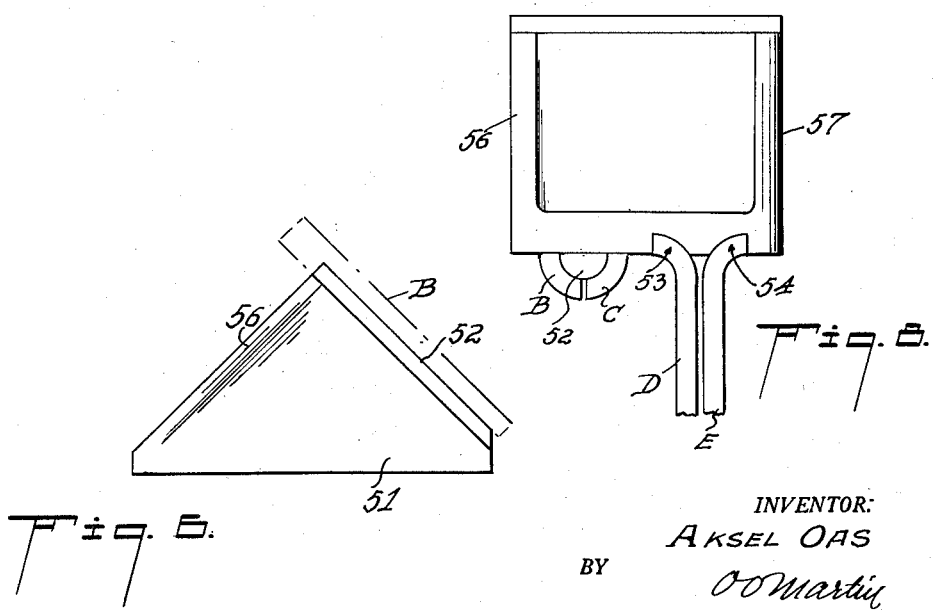
INVENTOR:
AKSEL OAS
BY O O Martin
ATTORNEY Aug. 7, 1951  A. OAS  2,563,059
TILE CUTTING MACHINE
Filed Aug. 30, 1948  2 Sheets-Sheet 2

INVENTOR:
AKSEL OAS
BY O. Martin
ATTORNEY.

Patented Aug. 7, 1951

2,563,059

UNITED STATES PATENT OFFICE 2,563,059

TILE CUTTING MACHINE

Aksel Oas, Anaheim, Calif.

Application August 30, 1948, Serial No. 46,827

4 Claims. (Cl. 125—14)

This invention relates to machines for cutting tiles such as used in kitchen and bathrooms of dwelling houses as well as in commercial and industrial buildings.

In cutting glazed tiles, such as ordinarily used, it is sometimes required to cut clear through the tiles, while at other times it is preferable not entirely to separate the tiles but to cut merely deep enough into the tile from the glazed side thereof to insure a clean break without chipping of the glazed surface thereof. This is done in order that the portion of the tile which has not been cut but which is subsequently severed, may present a surface rough enough to insure firm bonding when the tile is cemented in position.

It is in view of the foregoing the principal object of the invention to provide a tile cutting device which may be readily adjusted to produce a cut of any desired depth. Another object is to provide a machine which will produce a perfectly straight cut, this being essential in order to obtain perfect jointing in the laying of the tiles. A further object is to provide simple and efficient means for guiding and holding the tile to be cut in correct position to obtain the various types of angular cuts required in tile setting work.

These and other objects of the invention are fully set forth in the following detailed description and reference is directed to the accompanying drawings in which tile cutting devices embodying the invention are illustrated. In the drawings:

Fig. 1 is a side elevational view of a tile cutting machine such as used for cutting clear through the tile;

Fig. 2 is a substantially corresponding front view of the machine;

Figs. 6 to 8 are fragmentary views illustrating novel gaging means and the method of supporting tiles to be cut on such means.

Figure 3:
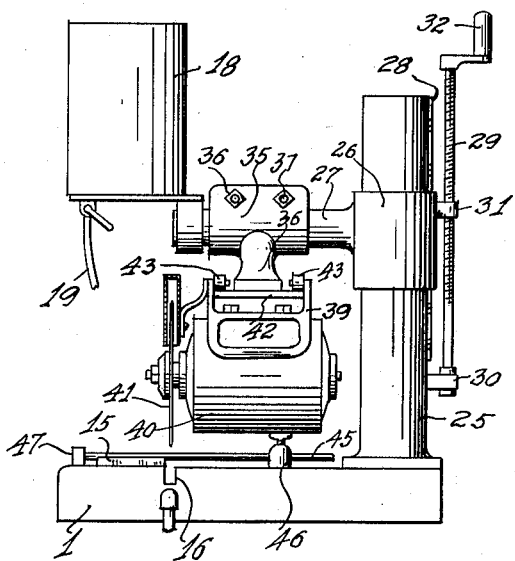
Fig. 3 is a front elevational view of a machine which is adjustable to produce a cut in a tile of any desired depth.

Referring in the first instance to Figs. 1 and 2, the numeral 1 designates the base from which a cylindrical post 2 rises to support thereon a sleeve 3 and the latter is in any suitable manner clamped rigidly in position on the post at the required elevation. A cylindrical stem 4 projects sidewise from this sleeve to form a pivot on which a cutter frame 5 is mounted for oscillating movement. The frame is, at the bottom thereof, fitted with a bearing member 6 in parallel axial relation to the stem 4. A shaft 7 is mounted for rotation within this bearing and it is at one end fitted to receive a cutter 8. A motor 9 is rigidly mounted on top of the frame 5 and it is fitted with a pulley 10 which, through the medium of a belt 11 riding on a pulley 12 of the axle 7, is operatively connected to rotate the cutter.

Figure 5:
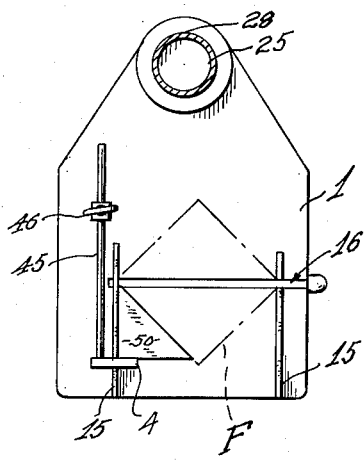
Fig. 5 is a plan view of the lower portion of the device.

On the base 1 is mounted a bar 15 which serves as a gage against which to seat the tile A in correct position to cut the tile squarely as indicated in Fig. 1, and a groove 16 is sunk through the bar and a distance into the base sufficient to afford clearance for the cutter to pass completely through the tile. But two bars 15 may be provided, substantially as indicated in Fig. 5, if found necessary. For the purpose of facilitating the cutting operation, the frame 5 is shown made with a handgrip 17, by means of which it may conveniently and easily be manipulated to force the cutter through the tile. It is furthermore to be noted that a tank 18 is secured to the top of the frame and that it is fitted with a tube 19 extending from the bottom thereof through the top of the cutter guard 20. The tank is to be filled with a suitable lubricant and a valve 21 is fitted into tube 19 to control flow of the lubricant to the cutter as may be required in practice.

Figure 4:
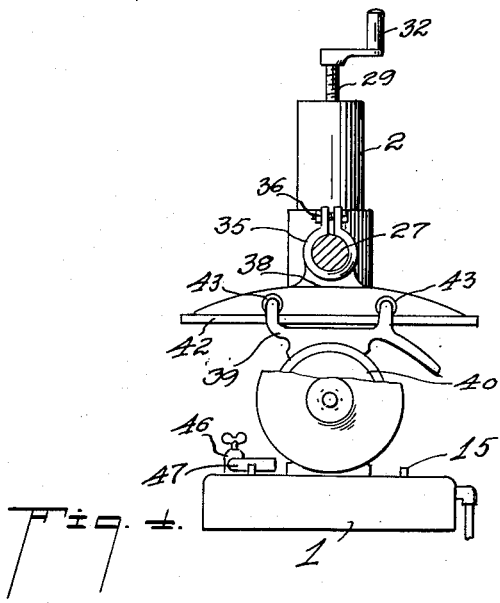
Fig. 4 is a side elevational view of the device of Fig. 3.

As above stated, the device of Figs. 3 and 4 is provided with means for adjusting the position of the cutter to vary the depth of the cut to be made. In this device the post 25, the bracket 26 and the stem 27 may remain substantially unchanged, the only difference being that a spline is axially sunk into the sleeve to receive a feather 28 of the post in order to maintain the sleeve unturned on the post.

It is furthermore to be noted that a screw 29 is fitted to rotate in a bearing 30 of the post and the screw threads thereof ride in a threaded projection 31 of the sleeve. A crank 32 is secured to the upper end of this screw and it is manually operable to rotate the latter thereby to adjust the bracket axially on the post.

A split sleeve 35 is seated on the stem 27 and it is by means of bolts or screws 36, 37 rigidly clamped in position thereon. A frame 38 extends horizontally from the bottom of this sleeve to form a guide for a carriage 39, which latter is shaped to support an electric motor 40. The latter may be substantially identical with the above described motor and it is similarly fitted to receive on the end of its shaft a cutter 41. As shown in Fig. 4, the motor is held suspended from the frame with its shaft in parallel relation to the stem 27. The motor is, for the purpose of such suspension, shown fitted with a carriage which rides on gibs forming a track 42 at the bottom of the bracket and anti-friction rollers 43 are mounted in the carriage in position to ride on this track.

When the motor mount is adjusted on the post to place the cutter vertically in the desired position relative to the base, it is merely necessary to hold the tile to be cut against the gage 15 and to draw the carriage forward to pass the cutter through the tile at the proper depth. In addition, it is well to seat a sliding rod 45 in a boss 46 of the base. This rod is fitted with an end stop 47 for the tile and it is axially adjustable correctly to position the tile relative to the cutter.

Figure 7:
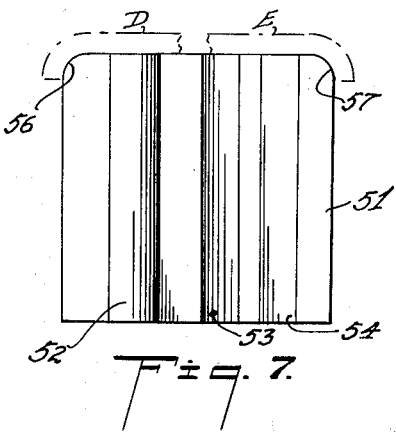

For the purpose of diagonal cuts, it is merely required correctly to place a triangular gage 50 on the base, against the gage bar 15 and the end stop 47, substantially as indicated in Fig. 5 and to rest the tile F thereagainst. For the purpose of other cuts, a guide 51 is provided of the shape substantially as illustrated in Figs. 6 to 8. The front and rear gaging surfaces of this guide are each set at an angle of 45° relative to the machine base and the front surface is made with a semicircular rib 52, the lower end of which is vertically trimmed to clear the cutter. The rib is proportioned to receive thereon curved edge heads B and C to be mitered to fit corners. In addition, right and left curved grooves 53, 54 are cut into this gaging surface of a shape to receive therein the edge of tiles such as indicated at D, E, in Fig. 8, to produce outside corners. The side edges 56, 57 of the inclined rear surface of the guide are shown rounded to receive thereon the tiles D, E, the curved edges of which are to be mitered to fit inside corners. It is a very easy matter to place this guide on the machine base, against the gage bar 15 and to hold the tile in position on the guide with one hand during the cutting operation while the other hand is employed to advance the cutter through the tile.

While I have in the foregoing described preferred forms of the invention, it is to be understood that modifications may be embodied within the scope of the claims hereto appended.

I claim:

1. In a tile cutting machine having a base and a rotatory cutter perpendicular thereto and movable across said base; a tile guide mountable on the base, said guide having front and rear surfaces at an angle of 45° relative to the base, a semi-cylindrical rib on said front surface for supporting curved tile beads, said surface having right and left curved grooves sunk therein parallel with said rib of a shape to receive therein the curved edges of tiles to be cut.

2. In a tile cutting machine having a base and a rotatory cutter perpendicular thereto and movable across said base; a tile guide mountable on the base, said guide having front and rear surfaces at an angle of 45° relative to the base, a semi-cylindrical rib on said front surface for supporting curved tile beads, said surface having right and left curved grooves sunk therein parallel with said rib of a shape to receive therein the curved edges of tiles to be cut, the side edges of said rear surfaces being rounded to receive the curved edges of such tiles when the tiles are held flatly against the rear surface.

3. In a tile cutting machine having a base and gaging members, a guide having a semi-cylindrical rib projecting from its front surface for supporting the inner surface of the curved bead of a tile and right and left curved grooves sunk therein parallel with said rib of a shape to receive therein the outer surface of the curved bead of a tile to be cut, the side edges of said rear surfaces being rounded to receive the curved inner surfaces of such tiles when they are held flatly against the rear surfaces of the guide.

4. In a tile cutting machine having a base and gaging members, a guide having inclined front and rear surfaces meeting at the top to form an equilateral rectangular triangle, said guide having a semi-cylindrical rib projecting from its front surface for supporting the inner surface of the curved bead of a tile and right and left curved grooves sunk therein parallel with said rib of a shape to receive therein the outer surface of the curved bead of a tile to be cut, the side edges of said rear surfaces being rounded to receive the curved inner surfaces of such tiles when they are held flatly against the rear surfaces of the guide.

AKSEL OAS.

REFERENCES CITED

The following references are of record in the file of this patent:

UNITED STATES PATENTS

| Number | Name | Date |
| --- | --- | --- |
| 127,728 | Aitken | June 11, 1872 |
| 198,963 | Bonney | Jan. 8, 1878 |
| 450,507 | Dalot | Apr. 14, 1891 |
| 1,950,824 | Suter | Mar. 13, 1934 |
| 2,393,073 | Tenny | Jan. 15, 1946 |
| 2,394,610 | Hawkins | Feb. 12, 1946 |
| 2,394,645 | Turner et al. | Feb. 12, 1946 |

FOREIGN PATENTS

| Number | Country | Date |
| --- | --- | --- |
| 577,059 | Great Britain | May 2, 1946 |